(12) United States Patent
Wei

(10) Patent No.: US 9,011,132 B1
(45) Date of Patent: Apr. 21, 2015

(54) EJECTING MECHANISM OF CUTTING DEVICE

(71) Applicant: Cheng Mei Machine Co., Ltd., Daxi Township, Taoyuan County (TW)

(72) Inventor: Chiou-Sheng Wei, Daxi Township, Taoyuan County (TW)

(73) Assignee: Cheng Mei Machine Co., Ltd., Taoyuan County (TW)

( * ) Notice: Subject to any disclaimer, the term of this patent is extended or adjusted under 35 U.S.C. 154(b) by 48 days.

(21) Appl. No.: 14/067,991

(22) Filed: Oct. 31, 2013

(51) Int. Cl.
*B29C 37/02* (2006.01)
*B29C 51/32* (2006.01)
*B29C 51/44* (2006.01)
*B29D 22/00* (2006.01)
*B29K 27/06* (2006.01)
*B29C 51/26* (2006.01)

(52) U.S. Cl.
CPC .............. *B29C 37/02* (2013.01); *B29D 22/003* (2013.01); *B29K 2027/06* (2013.01); *B29K 2023/06* (2013.01); *B29C 51/268* (2013.01); *B29C 51/445* (2013.01); *B29C 51/44* (2013.01)

(58) Field of Classification Search
CPC ...... B29C 37/02; B29C 51/44; B29C 51/445; B29C 51/268; B29D 2027/06; B29D 2023/06
USPC .......... 83/30, 44, 54, 178; 425/289–298, 313, 425/314, 315, 316
See application file for complete search history.

(56) References Cited

U.S. PATENT DOCUMENTS

| 3,765,785 | A | * | 10/1973 | Humphreys et al. | .......... 425/307 |
| 4,755,129 | A | * | 7/1988 | Baker et al. | .................... 425/292 |
| 6,027,327 | A | * | 2/2000 | Felder | ........................... 425/438 |
| 6,527,687 | B1 | * | 3/2003 | Fortney et al. | .................. 493/56 |
| 6,719,554 | B2 | * | 4/2004 | Hobson | ......................... 425/289 |
| 6,981,863 | B2 | * | 1/2006 | Renault et al. | ................ 425/290 |

* cited by examiner

*Primary Examiner* — Joseph S Del Sole
*Assistant Examiner* — Thu Khanh T Nguyen
(74) *Attorney, Agent, or Firm* — Leong C. Lei

(57) ABSTRACT

An ejecting mechanism of a cutting device includes a base, a moving plate, guide columns and elastic elements. The cutting device includes a power module, a knife mold and a cutting mold. The power module is coupled to the knife mold; the knife mold has blade portions; the cutting mold includes at least one mold cavity corresponsive to the blade portions for cutting an end product and a connecting portion of a blank. The base is fixed in the mold cavity; the guide columns and elastic elements are included between the moving plate and the base; at least one supporting portion is provided at the periphery of the moving plate corresponsive to the end product; and the elastic elements heighten the moving plate to latch the end product into the knife mold and allow the moving plate to move with the knife mold for automated production.

7 Claims, 7 Drawing Sheets

EJECTING MECHANISM OF CUTTING DEVICE

BACKGROUND OF THE INVENTION

1. Field of the Invention

The present invention relates to the technical field of a compressed air molding equipment, and more particularly to the equipment applied in an ejecting mechanism of a cutting device for ejecting and latching a cut end product in a knife mold and moving the end product accordingly to facilitate an automated manufacturing process.

2. Description of the Related Art

In general, plastic cups for containing beverage or food packaging containers for a protection purpose are manufactured by compressing a blank such as a PVC film or PE film into various different shapes and forms by vacuum pressure or atmospheric pressure through vacuum molding equipments or compressed air molding equipment.

To improve the molding quality and efficiency of a fully automated production by using the compressed air molding equipment, through holes are formed in rows on both sides of the blank respectively for driving the blank to move in the compressed air molding equipment during manufacturing processes such as forming, cutting and receiving processes. In the cutting process, notches are formed on a blade portion of a knife mold to facilitate the process of receiving the material by a stack method, so that when the knife mold is aligned with a cutting mold to perform the cutting process, contacts are formed between the end product and the blank, so as to continuously feed materials. In the process of receiving materials, at least one ejector rod pushes the end product, so that the end products can be stacked with one another by the effect of gravitational force after the contacts are broken.

However, the contacts have a very small width, and thus some of the contacts have been broken already in the step of dragging the blank, and a tilted angle between the end product and the blank is resulted. When the ejector rod is stretched out, and the end product cannot be pushed or ejected completely, it is necessary to remove the end product manually, so that the automated production is delayed, and the production efficiency is affected. Since the contacts are ejected or broken by the ejector rod, bumps are formed at the periphery of the end product and cannot be eliminated completely. Therefore, the end product has a poor look, and may cut or injure users easily. Obviously, the aforementioned drawbacks must be overcome and improved.

SUMMARY OF THE INVENTION

In view of the aforementioned drawbacks of the prior art, it is a primary objective of the present invention to overcome the drawbacks by providing an ejecting mechanism of a cutting device, such that when the cutting process takes place, an end product is pushed and latched to a knife mold, and the end product can be moved with the knife mold to a material receiving position, and finally an ejector rod installed in the knife mold is used to eject the end product to achieve the stacking effect and the fully automated production effect. In addition, no bumps are formed at the periphery of the end product when the aforementioned method is adopted, so that the invention can improve the production efficiency and quality significantly.

To achieve the aforementioned objective, the present invention provides an ejecting mechanism of a cutting device, wherein the cutting device includes a power module, a knife mold and a cutting mold, and the power module is coupled to the knife mold, and the knife mold has a plurality of blade portions, and the cutting mold is corresponsive to the blade portions and includes at least one mold cavity, and the power module drives the knife mold to engage with the cutting mold for cutting an end product and a connecting portion of a blank, and the ejecting mechanism comprises: a base, fixed onto the bottom of the mold cavity; a moving plate, installed on the base and having an interval apart from a side of the base, and the top of the moving plate being corresponsive to the end product and having at least one supporting portion; a plurality of guide columns, installed between the base and the moving plate, for guiding the direction of the moving plate moving vertically with respect to the base; and a plurality of elastic elements, installed between the base and the moving plate; such that after the knife mold and the cutting mold are engaged and the connecting portion is cut, the moving plate is ejected by the resilience of the elastic elements, and the supporting portion is provided for latching the end product into the knife mold, so that the end product can move with the knife mold.

In a preferred embodiment of the present invention, the supporting portion is substantially an L-shaped structure, viewing from a cross-sectional side. To cope with the cutting requirements, the quantity, the installation position, and the shape of the supporting portion may vary as follows: (1) The supporting portion is corresponsive to the mold cavity and the plurality supporting portions are installed on at least one pair of edges of the moving plate; (2) The supporting portion is corresponsive to the mold cavity and the plurality supporting portions are installed at four corners of the moving plate; (3) The supporting portion is corresponsive to the mold cavity and the plurality supporting portions are installed on at least one pair of symmetric edges and four corners; and (4) The supporting portion is corresponsive to the mold cavity and has a fence structure surrounding the periphery of the moving plate.

It is noteworthy that the base, the moving plate and the supporting portion have a total height greater than or equal to the depth of the mold cavity, so that the resilience of the elastic element can be used to eject the end product into the knife mold.

DETAILED DESCRIPTION OF THE PREFERRED EMBODIMENTS

Figure 1:
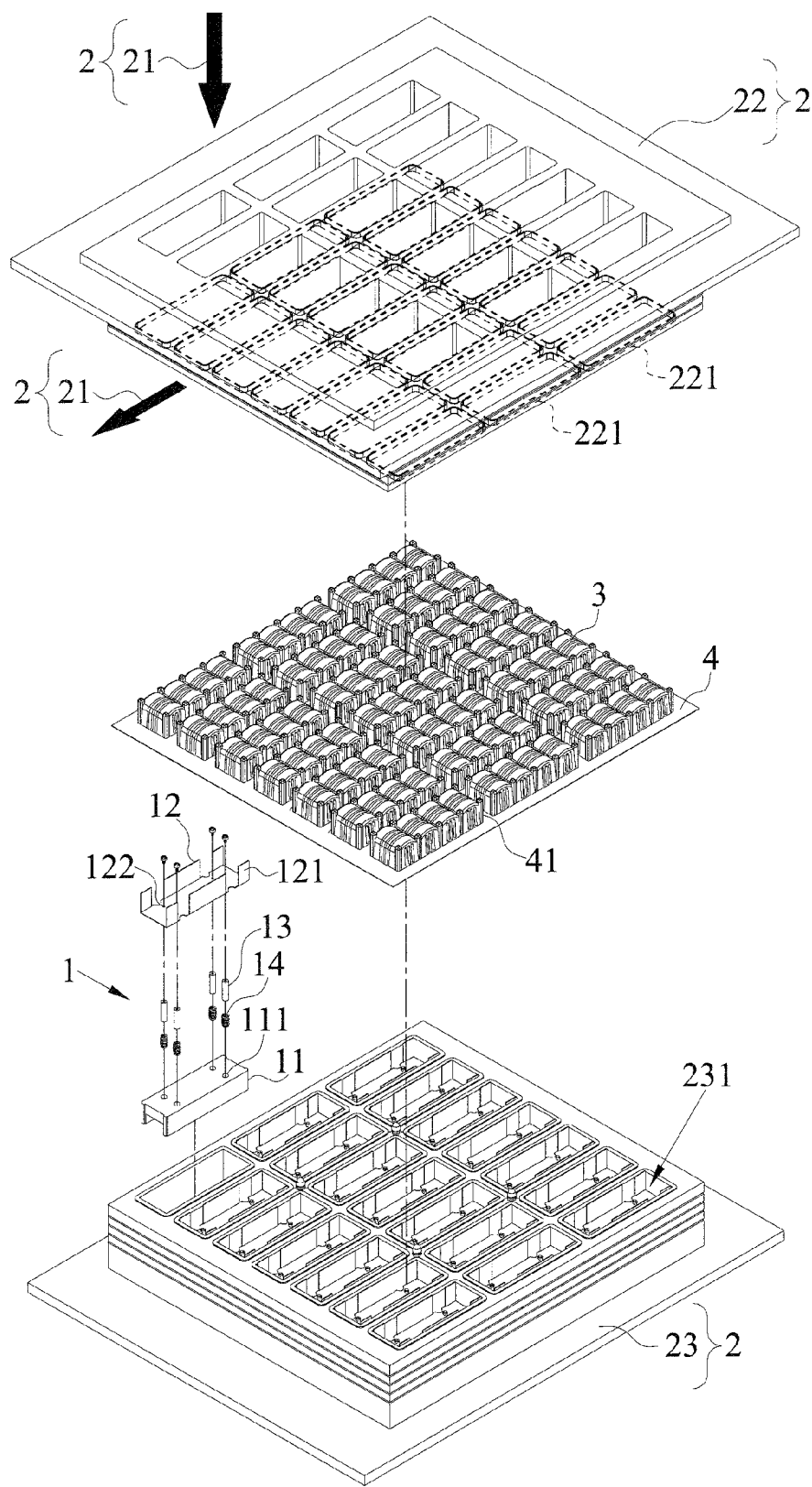
FIG. 1 is a schematic view of an installation of a preferred embodiment of the present invention.
Figure 2:
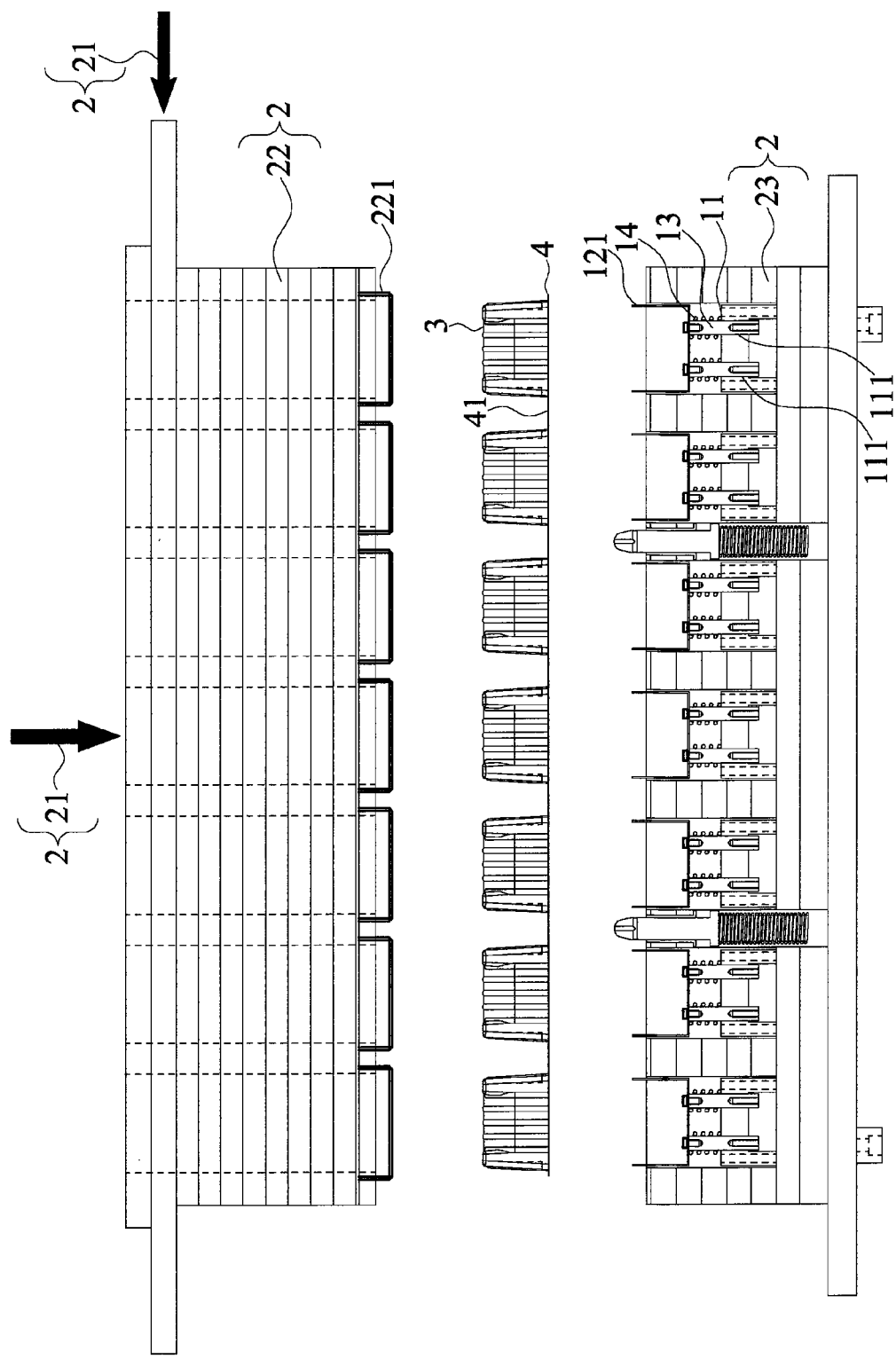
FIG. 2 is a schematic view of a structure of a preferred embodiment of the present invention.

The aforementioned and other objectives, technical characteristics and advantages of the present invention will become apparent with the detailed description of preferred embodiments and the illustration of related drawings as follows.

With reference to FIGS. 1 to 4 for schematic views of an installation, a structure, and continuous movements of an operation of an ejecting mechanism in accordance with a preferred embodiment of the present invention, the ejecting mechanism 1 comprises a base 11, a moving plate 12, four guide columns 13 and four elastic elements 14. The ejecting mechanism 1 is installed in a cutting device 2, wherein the cutting device 2 comprises a power module 21, a knife mold 22 and a cutting mold 23. In this preferred embodiment, the power module 21 and the knife mold 22 are disposed at the top of the cutting device 2, and the cutting mold 23 is disposed at the bottom of the cutting device 2, and the power module 21 is coupled to the knife mold 22 for driving the knife mold 22 to move back and forth horizontally and up and down vertically, and the knife mold 22 has a plurality of blade portions 221 disposed at the bottom of the knife mold 22, and the cutting mold 23 is corresponsive to the blade portions 221 and includes a mold cavity 231. When the power module 21 drives the knife mold 22 to descend, the knife mold 22 is engaged with the cutting mold 23 to cut a connecting portion 41 of an end product 3 and a blank 4.

Wherein, the base 11 is fixed to the bottom of the mold cavity 231, and the base 11 is substantially a rectangular box having a plurality of guide holes 111 formed on the top of the box.

The moving plate 12 is formed by bending a metal sheet and disposed with an interval apart from a side of the base 11, and the moving plate 12 includes a plurality of supporting portions 121 disposed at the periphery of the top of the moving plate 12, and some of the supporting portions 121 are exposed from the mold cavity 231. In addition, the supporting portions 121 as shown in the figure are corresponsive to the mold cavity 231 provided at two pairs of symmetric edges of the mold cavity 231, wherein the supporting portions 121 are sections of the metal sheet of the two edges of the moving plate being bent vertically upward to form a U-shaped structure. It is noteworthy that the base 11, the moving plate 12 and the supporting portion 121 have a total height greater than or equal to the width of the mold cavity 231, and the ejecting mechanism 1 has an appropriate height for heightening the cut end product 3. In addition, the moving plate 12 includes a plurality of fixing holes 122 formed thereon.

Each of the guide columns 13 has an end fixed into the fixing holes 122 and the other end movably passed into the guide holes 111, so that the guide column 13 is included between the moving plate 12 and the base 11, and the moving plate 12 can just move reciprocally in a vertical direction along the extending direction of the guide holes 111 and the guide columns 13 only.

Each of the elastic elements 14 is concentrically sheathed on each of the guide column 13 respectively, and the elastic element has an end abutting against the top of the base 11 and the other end abutting against the bottom of the moving plate 12, so that the elastic elements 14 are included between the base 11 and the moving plate 12, and the resilience of the elastic elements 14 can heighten the moving plate 12.

Figure 3:
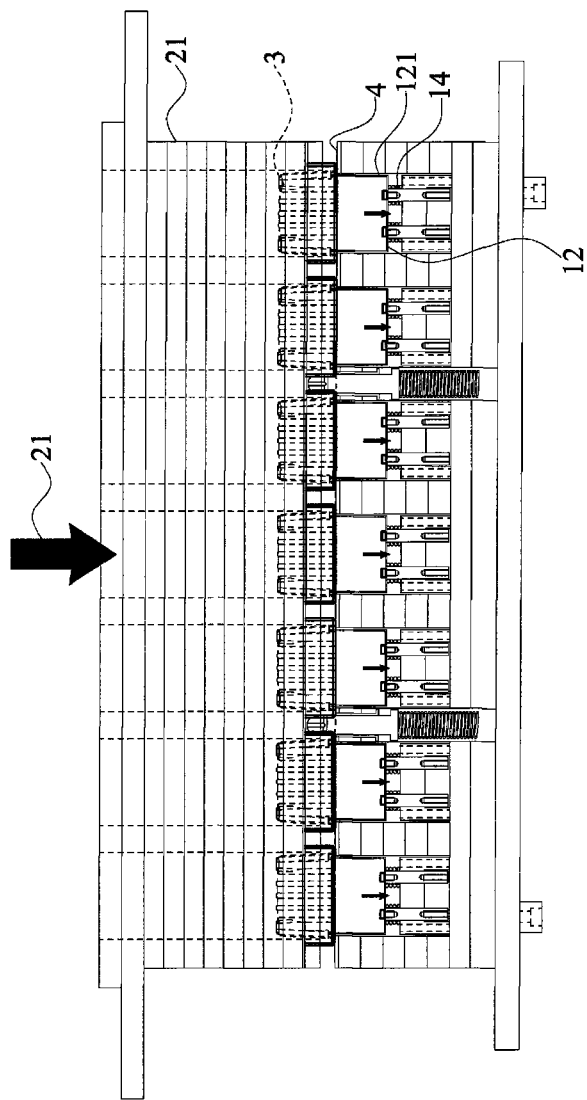
FIG. 3 is a first schematic view of movements in an operation of a preferred embodiment of the present invention.
Figure 4:
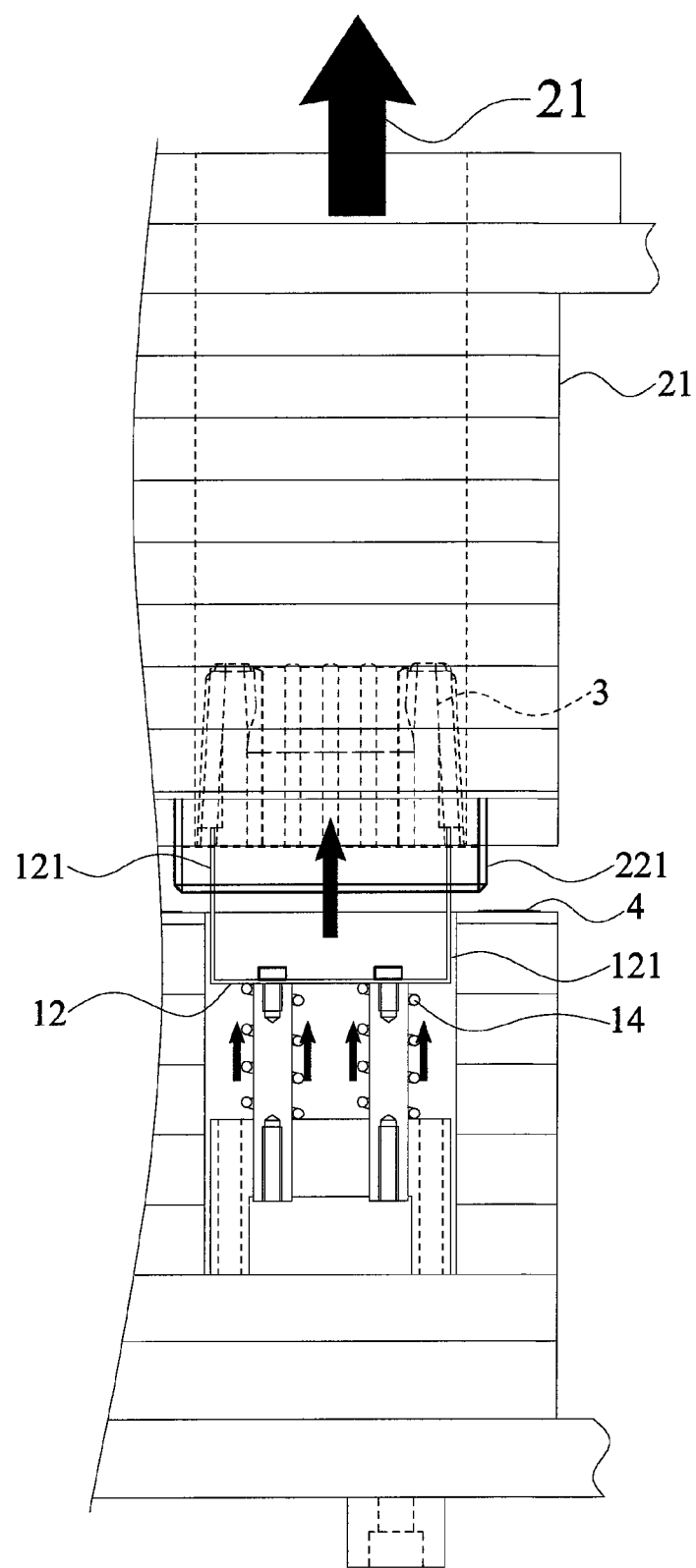
FIG. 4 is a second schematic view of movements in an operation of a preferred embodiment of the present invention.

In an operation as shown in FIGS. 3 and 4, the knife mold 21 is driven by the power module 21 to descend, so that the knife mold 22 and the cutting mold 23 are engaged with each other, and the blade portions 211 cut the connecting portion 41 to separate the end product 3 from the blank 4. And then, the power module 21 drives the knife mold 22 to ascend in an opposite direction. In the meantime, the moving plate 12 is heightened by the resilience of the elastic elements 14, and the supporting portions 121 are provided for latching the end product 3 into the knife mold 21. In other words, the recession formed by the blade portions 221 allows the end product 3 to move with the knife mold 21.

Figure 5:
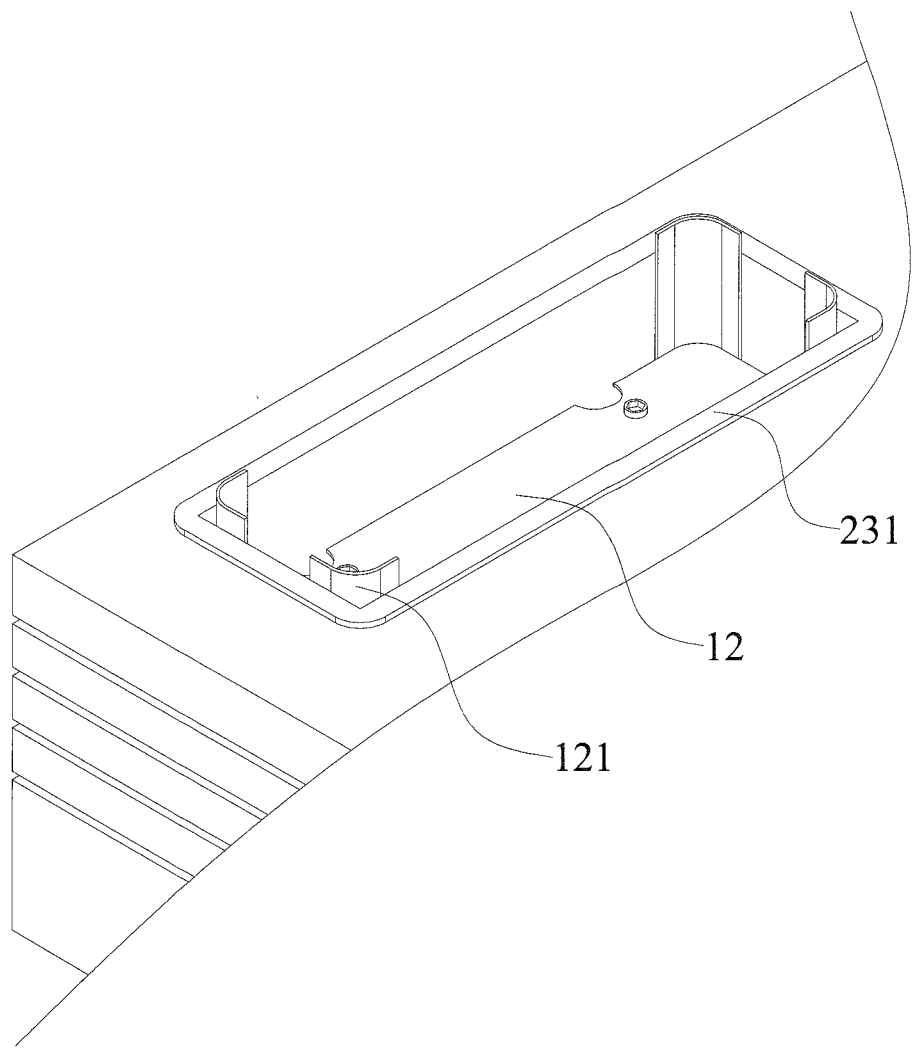
FIG. 5 is a schematic view of a first implementation mode of a supporting portion of a preferred embodiment of the present invention.
Figure 6:
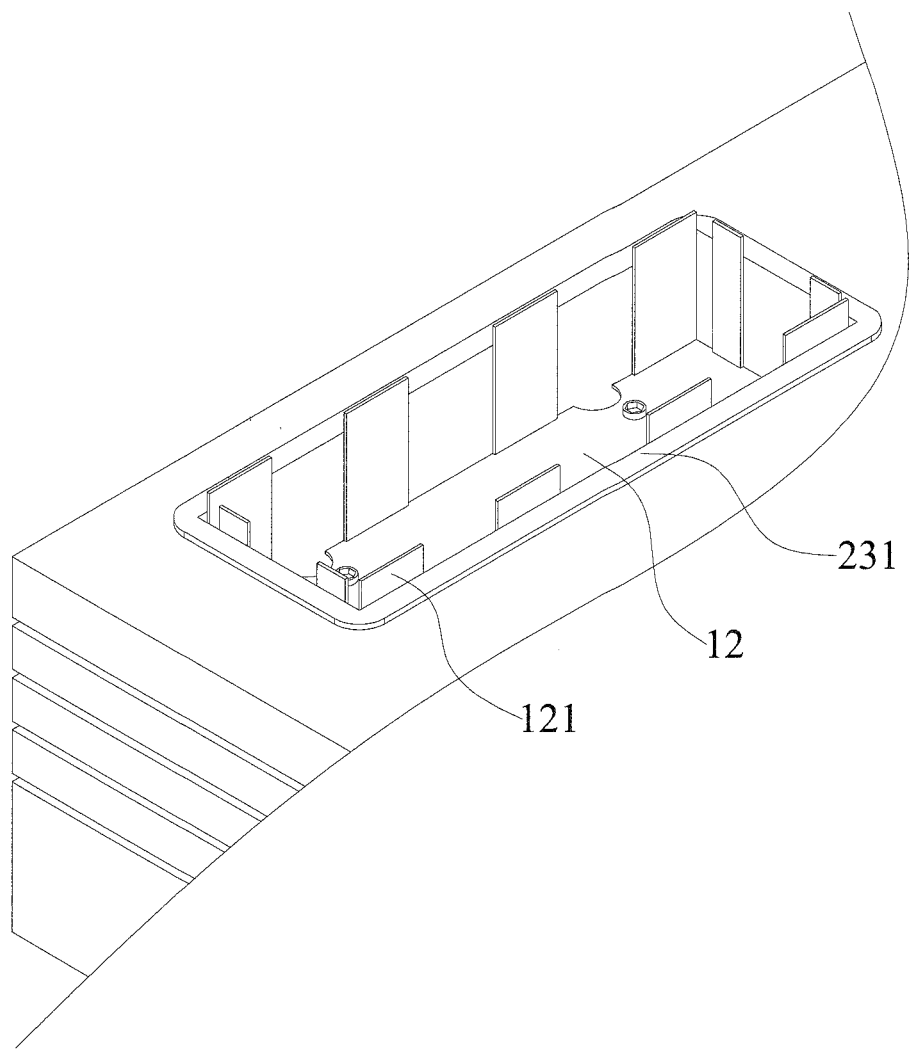
FIG. 6 is a schematic view of a second implementation mode of a supporting portion of a preferred embodiment of the present invention.
Figure 7:
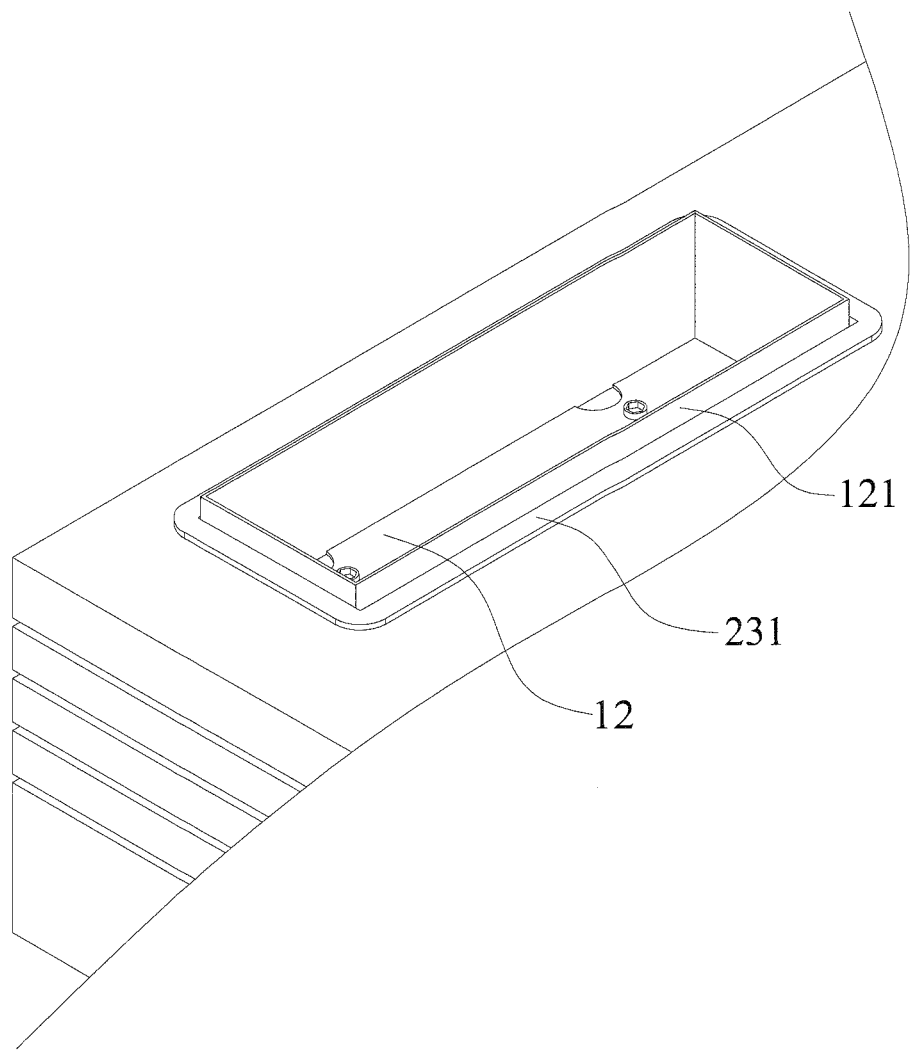
FIG. 7 is a schematic view of a third implementation mode of a supporting portion of a preferred embodiment of the present invention.

To cope with different requirements, the supporting portion of the present invention may have different installation positions and shapes. With reference to FIGS. 5 to 7 for different implementation modes of a supporting portion of a preferred embodiment of the present invention, the supporting portions 121 as shown in FIG. 5 are arranged at positions corresponding to the mold cavity 231 and the supporting portions 121 are disposed at the four corners of the moving plate 12 respectively. In FIG. 6, the supporting portions 121 can be arranged at positions corresponding to the mold cavity 231, and the supporting portions 121 are disposed at two pairs of symmetric edges and four corners of the moving plate 12. In FIG. 7, the supporting portions 121 are corresponsive to the mold cavity 231 and enclosed to form a fence structure surrounding the periphery of the moving plate 12.

What is claimed is:

1. An ejecting mechanism of a cutting device, and the cutting device comprising a power module, a knife mold and a cutting mold, and the power module being coupled to the knife mold, and the knife mold including a plurality of blade portions, and the cutting mold being corresponsive to the blade portions and including at least one mold cavity, and the power module driving the knife mold to be engaged with the cutting mold for cutting a connecting portion of an end product and a blank, and the ejecting mechanism comprising:
   a base, fixed onto the bottom of the mold cavity;
   a moving plate, installed on the base and having an interval apart from a side of the base, and the top of the moving plate being corresponsive to the end product and having at least one supporting portion;
   a plurality of guide columns, installed between the base and the moving plate, for guiding the direction of the moving plate moving vertically with respect to the base; and
   a plurality of elastic elements, installed between the base and the moving plate; such that after the knife mold and the cutting mold are engaged and the connecting portion is cut, the moving plate is ejected by the resilience of the elastic elements, and the supporting portion is provided for latching the end product into the knife mold, so that the end product can move with the knife mold.

2. The ejecting mechanism of a cutting device according to claim 1, wherein the supporting portion is substantially an L-shaped structure, viewing from a cross-sectional side.

3. The ejecting mechanism of a cutting device according to claim 2, wherein the supporting portion is corresponsive to the mold cavity, and the plurality of supporting portions are installed on at least one pair of edges of the moving plate.

4. The ejecting mechanism of a cutting device according to claim 2, wherein the supporting portion is corresponsive to the mold cavity and the plurality of supporting portions are installed at four corners of the moving plate.

5. The ejecting mechanism of a cutting device according to claim 2, wherein the supporting portion is corresponsive to the mold cavity and the plurality of supporting portions are installed on at least one pair of symmetric edges and four corners of the moving plate.

6. The ejecting mechanism of a cutting device according to claim 2, wherein the supporting portion is corresponsive to the mold cavity to form a fence structure surrounding the periphery of the moving plate.

7. The ejecting mechanism of a cutting device according to claim 1, wherein the base, the moving plate and the supporting portion have a total height greater than or equal to the depth of the mold cavity.

* * * * *